United States Patent Office 3,439,426
Patented Apr. 22, 1969

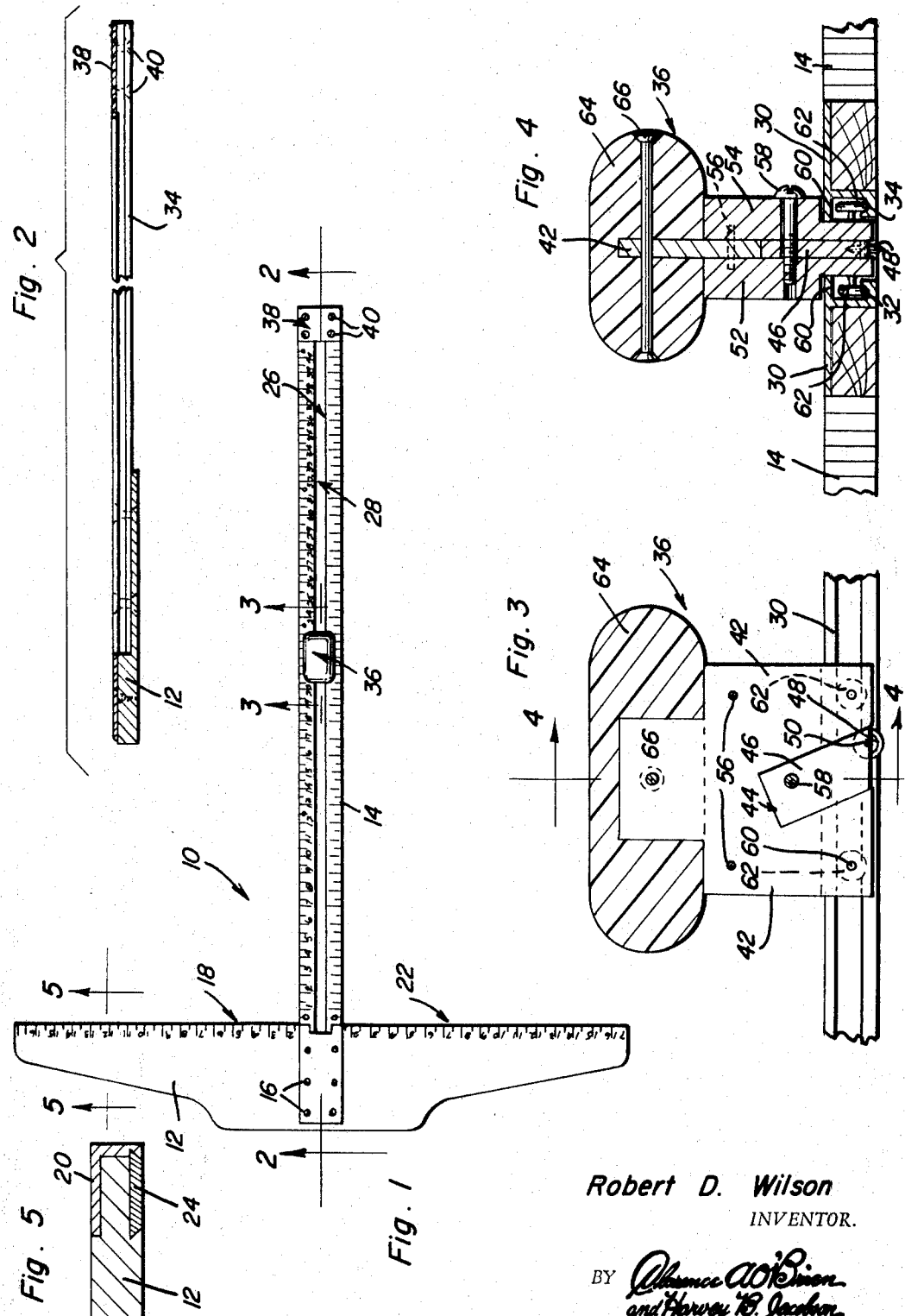

3,439,426
GLASS-CUTTING TOOL
Robert D. Wilson, 1040 N. Juniper,
Coquille, Oreg. 97423
Filed Mar. 29, 1967, Ser. No. 626,806
Int. Cl. B26b 27/00
U.S. Cl. 33—32　　　　　　　　　　　　　　2 Claims

ABSTRACT OF THE DISCLOSURE

A glass-cutting tool of a T-square configuration having a cutter head carried by and slidable longitudinally along the tongue portion of the T-square to facilitate cutting or scoring the upper surface of a sheet of glass placed therebeneath which cut is made at right angles to one edge of the sheet of glass contiguous with the head portion of the T-square and wherein the head and tongue portions are graduated to facilitate simultaneously measuring and cutting the glass.

---

The present invention relates to a glass-cutting tool and more particularly to a glass-cutting tool having a T-square configuration and provided with a cutter means longitudinally slidable in and rollingly carried by the tongue portion of the T-square.

It is an object of the present invention to provide an improved construction for a glass-cutting tool of simplified construction which may be utilized to simultaneously measure and cut a sheet of glass.

Another object of the present invention is to provide an improved construction for a glass-cutting tool of a T-shaped configuration provided with a cutter carriage track integral with the tongue portion of the T-square which slidably accommodates a glass cutter means adapted to be manually traversed along the track means to score or effectively cut a sheet of glass placed therebeneath.

A further object of the present invention is to provide an improved construction for a glass-cutter tool of a T-shaped configuration wherein both the head and tongue portions of the T-square are calibrated with a suitable measuring scale and the head portion is also provided with an extensible slide extension rule so as to facilitate the simultaneous measuring and cutting of relatively large sheets of glass.

Another object of the present invention is to provide a T-square shaped glass-cutting tool wherein a glass cutter element will be accurately guided to score and thus effectively cut a sheet of glass at generally right angles to an edge thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top elevational view of an exemplary embodiment of a glass-cutting tool constructed in accordance with the principles of the present invention;

FIGURE 2 is an enlarged fragmentary longitudinal vertical cross-sectional view of the glass-cutting tool of FIGURE 1 taken substantially along the plane of the line 2—2 of FIGURE 1;

FIGURE 3 is an enlarged vertical longitudinal cross-sectional view of a glass-cutter carriage means slidably carried by the tongue portion of the glass-cutting tool of FIGURE 1 which sectional view is taken substantially along the plane of the line 3—3 of FIGURE 1;

FIGURE 4 is a transverse vertical sectional view of the glass-cutter means of FIGURE 3 taken substantially along the plane of the line 4—4 of FIGURE 3; and FIGURE 5 is an enlarged fragmentary vertical cross-sectional view of a head portion of the glass-cutting tool of FIGURE 1 taken substantially along the plane of the line 5—5 of FIGURE 1 and further showing a slide extension rule carried by the underside of the head portion.

Referring now to the drawings and FIGURE 1 in particular, it will be seen that the T-square shaped glass-cutting tool indicated generally at 10 includes a head portion 12 and a tongue portion 14 integrally secured to the head portion 12 such as by fasteners 16 so as to secure the tongue 14 at generally right angles to the head 12.

As seen best in FIGURES 1 and 5 the head portion 12 is provided with a vertically disposed planar surface indicated generally at 18 preferably, although not necessarily, defined by a calibrated L-shaped straight edge means 20 provided, as best seen in FIGURE 1, with a measuring scale indicated generally at 22 having a zero reference point centrally disposed intermediate the ends of the head portion 12 and comprising the zero calibration on the head portion 12. The head portion 12 is provided with two such scales extending outwardly from the zero reference point. In order to keep the size of the head portion 12 within reasonable limits, and still provide for the measurement of relatively large sheets of glass, the head portion 12, preferably adjacent the underside thereof, is provided with a slide extension rule 24 slidably received within a dovetail slot communicating with the underside of the head portion 12 as best seen in FIGURE 5. In practice, the graduated scale 22 on either side of the centrally disposed zero reference point on the head portion 12 is preferably, although not necessarily, 18 inches in length and the slide extension rule 24, which may be utilized from either side of the head portion 12, is also preferably 18 inches in length thereby permitting the measuring and cutting of a sheet of glass having a maximum dimension in one direction of approximately 36 inches.

The tongue portion 14, such as formed of wood for example, is provided with a longitudinally extending glass cutter carriage track means indicated generally at 26 including a slot indicated at 28 defined by a pair of horizontally disposed H-shaped track members 30 having their base portions diametrically opposed and inwardly opening and as best seen in Figure 4, which comprise aluminum extrusions, for example, and provide complementary tracks 32 and 34 within which is slidably and rollingly received a cutter carriage means indicated generally at 36 which is not normally removable from the track means. The track members 30, as best seen in FIGURE 1, are provided with calibrations on the longitudinally extending horizontally disposed surfaces thereof which graduations have a zero point coinciding with the vertical planar surface 18 of the head portion 12. Although not specifically shown, it will be appreciated that the track members 30 are secured to the tongue portion 14 by suitable means such as adhesive, screws, etc. The longitudinally extending slot 28 communicates with the outwardly disposed end carriage means 36 within the trackways 32 and 34 and as seen best in FIGURE 1 the tongue portion 14 is provided with a removably secured cutter carriage retainer plate 38 secured to the upper surface of the tongue portion 14 by removable fasteners such as screws 40 so as to retain the cutter carriage means 36 within the trackways 32 and 34 in normal operation of the glass-cutting tool 10 while permitting disassembly of the cutter carriage means 36 from the trackways 32 and 34 as desired for reasons which will become clear hereinafter.

Referring once again to FIGURE 1 and FIGURES 3 and 4 it will be seen that the cutter carriage means 36 includes a vertically extending centrally disposed cutter carriage plate 42 having a generally rectangular opening 44 therein preferably angularly disposed relative to the bottom of the plate 42 so as to be at an acute angle relative thereto and adapted to recieve therein a glass cutter wheel mounting block 46 within which is rotatably journaled a circular glass cutter wheel 48 rotatably journaled thereto by a pin 50 and positioned so as to have its cutting edge project downwardly slightly below the underside of the tongue 14. The cutter block 46 is retained within the plate 42 by a pair of carriage roller plates 52 and 54 nonrotatably located relative to the plate 42 by guide pins 56 carried by the plate 42 and projecting horizontally outwardly from both sides thereof and received in complementary bores in the plates 52 and 54 which plates 52 and 54 are removably secured to the plate 42 by a fastener member 58 such as comprising a threaded bolt passing through suitable apertures in the roller block 54, cutter block 46 and roller block 52 within which it is threadedly received. The roller blocks 52 and 54 are each provided with a pair of horizontally disposed laterally extending shafts 60 upon which are rotatably journaled rollers 62 such as formed of nylon for example. Accordingly, it will be appreciated that the cutter carriage means 36 may be rolled along the tongue portion 14. In addition, to facilitate manipulation of the cutter carriage 36 the upper portion of the plate 42 is preferably provided with a handle 64 secured to the plate 42 such as by a suitable fastener comprising a rivet 66 received within suitable apertures in both the handle 64 and the plate 42.

To cut a piece of glass it is merely necessary to place the T-square glass-cutting tool 10 over a sheet of glass with the edge of the glass contiguous with the edge 18 of the head portion 12 with the zero point of the calibration thereon in alignment with the point on the glass sheet which is to be scored and thus effectively cut. Once this has been done it is then merely necessary to grasp the handle 64 of the cutter carriage 36 and draw the cutter carriage 36 along the tongue 14 to score the sheet of glass at right angles to the edge thereof after which it is merely necessary to apply a slight strain to the glass so as to cause it to part along the score line created by the cutter wheel 48 as it traversed the surface of the glass sheet.

The cutter carriage 36 may be removed from the track means 26 by detaching the retainer plate 38 to permit replacement of the glass cutter wheel 48 by removing the bolt 58, cutter block 46 and cutter wheel mounting shaft 50.

From the foregoing, it will be appreciated that the glass-cutting tool 10 of the present invention incorporates the features of a T-square, measure and glass cutter in a single lightweight, relatively inexpensive portable tool so as to provide a relatively fast efficient means of making right angle cuts on sheet glass. Although not shown, it will nevertheless be appreciated that a glass-cutting tool constructed in accordance with the principles of the present invention could also have an L-shaped configuration wherein the head portion of the tool would only project latterally to one side of the tongue portion.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. A glass-cutting tool comprising a frame means having a head portion and a tongue portion, said head portion, said head portion being provided with a straight edge adapted to be positioned contiguous with an edge of a sheet of glass to be cut, said tongue portion being secured to said head portion at right angles thereto in generally the same plane, said tongue portion being provided with a cutter carriage track means disposed at right angles to said straight edge, a palm engageable handled cutter carriage means rollingly mounted in said cutter carriage track means, a cutter head means carried by said cutter carriage means and a glass cutter wheel means rotatably journalled to said cutter head means for rotation about an axis parallel to said straight edge, said cutter projecting downwardly beneath said tongue portion for cutting engagement with a sheet of glass to be positioned contiguous with the underside of said tongue portion whereby said cutter carriage means can be traversed along said track means to score and effectively cut a sheet of glass positioned contiguous with the underside of said tongue, said straight edge of said head portion being provided with a calibrated scale to facilitate simultaneously measuring and effectively cutting a sheet of glass that is positioned beneath said tongue portion, said tongue portion being provided with a calibrated scale having a zero point coinciding with said straight edge of said head portion, said cutter carriage track means comprising a pair of horizontally disposed diametrically opposed inwardly opening H-shaped track member extending longitudinally along said tongue portion and defining a trackway within which said cutter carriage means is trackingly mounted the upwardly diverging portions of said H-shaped track members carrying said calibrated scale on said top portions, said cutter carriage means including a vertically disposed cutter carriage plated provided with a trapezoidal opening therein in communication with the lower edge thereof, a trapezoidal glass cutter wheel mounting plate mounted within said trapezoidal opening and having a recess in the lower edge portion thereof for generally nestingly receiving said glass cutter wheel therein, said cutter wheel mounting plate being retained therein by a through fastener securing a pair of carriage roller plates removably secured to both sides of said carriage plate, a plurality of rollers carried by said roller plates for rollingly tracking said cutter carriage along said trackway, said glass cutter wheel being rotatably journalled in said cutter carriage means by a shaft carried by and extending between said carriage roller plate, and said rollers being disposed forwardly and rearwardly of said glass cutter wheel in each of said track members.

2. The glass-cutting tool of claim 1 further including a slide extension rule slidably carried by said head portion adjacent the underside thereof, said slide extension rule being extensible outwardly from said head portion in generally parallel relation to said straight edge.

References Cited

UNITED STATES PATENTS 1,100,878 6/1914 Higgins et al.
2,814,163 12/1957 Krulwich.
3,127,680 4/1964 Brichard et al.

FOREIGN PATENTS 383,248 12/1964 Switzerland.

MYRON C. KRUSE, *Primary Examiner.*

R. V. PARKER, *Assistant Examiner.*

U.S. Cl. X.R.

30—164.95; 7—14.1